United States Patent [19]
Tolbert et al.

[11] Patent Number: 5,416,475
[45] Date of Patent: May 16, 1995

[54] REMOTE METER READING RECEPTACLE FOR PIT LID MOUNTING

[75] Inventors: Joel L. Tolbert, Montgomery; Thierry W. Swinson, Wetumpka, both of Ala.

[73] Assignee: Schlumberger Industries, Inc., Norcross, Ga.

[21] Appl. No.: 96,201

[22] Filed: Jul. 23, 1993

[51] Int. Cl.6 .................... G01F 15/06; G01F 15/14
[52] U.S. Cl. .................... 340/870.02; 340/870.31; 324/156; 73/273; 73/431; 73/861.78
[58] Field of Search .................... 73/272 A, 273, 431, 73/861.78; 324/156, 157; 340/870.01, 870.02, 870.31

[56] References Cited

U.S. PATENT DOCUMENTS

| | | | |
|---|---|---|---|
| 3,059,849 | 10/1962 | Saltzman | 73/272 A |
| 4,085,287 | 4/1978 | Kullmann et al. | 340/870.02 |
| 4,491,793 | 1/1985 | Germer et al. | 324/157 |
| 4,793,192 | 12/1988 | Jerger et al. | 73/861.78 |
| 5,155,481 | 10/1992 | Brennan et al. | 340/870.02 |

FOREIGN PATENT DOCUMENTS 4155222 5/1992 Japan ................. 73/861.78

Primary Examiner—John K. Peng
Assistant Examiner—Daniel J. Wu
Attorney, Agent, or Firm—Sanford J. Asman

[57] ABSTRACT

A remote meter reading receptacle for pit lid mounting includes an annular, cup-shaped housing containing a ferrite coil and electronic circuit board. This housing is mounted within an outer shroud which has an annual flange formed about its periphery. The shroud includes a pair of openings, the first for receiving a threaded fastener, such a bolt, and the other for receiving an electrical cable connected to the circuit board of the housing. The shroud is dimensioned to fit securely within an opening formed in the lid of a pit-type meter box, such as used for outdoor setting of water meters. A complementary cup-shaped washer includes a pair of openings for cooperating with the threaded fastener and for receiving the electrical cable. The washer is disposed on the underside of the pit lid and receives the threaded fastener to fasten the housing and shroud assembly securely to the upper surface of the pit lid. The washer is reversible to accommodate a wide range of pit-lid thicknesses. The pit lid receptacle requires only a single hole to be drilled in the pit lid. The receptacle is formed from a ultraviolet stable polycarbonate plastic material. The receptacle is low in profile and provides for secure positioning of the ferrite coil and associated electronic circuit board in an easily assembled housing assembly.

10 Claims, 5 Drawing Sheets

REMOTE METER READING RECEPTACLE FOR PIT LID MOUNTING

BACKGROUND OF THE INVENTION

1. Field of the Invention

The invention relates to the field of remote meter reading receptacles and, more particularly, to an inductive type remote meter reading receptacle for use with pit-type utility meters, such as water meters.

2. Description of the Prior Art

In the water metering industry, it is common to place or "set" water meters in a so-called "pit" location between the service entrance of a residence or place of business and a main water line. The meter is typically placed in a pit at a depth below the frost line for the area.

In order to prevent subsidence of the ground around the pit, and the entry of unwanted debris which might otherwise cover up or obscure the meter and its register, it is common to place the water meter within an enclosure called a meter box. The meter box is designed to be set into the pit which is dug into the ground. The meter box typically has openings to allow the water line running from the water main to the meter and from the meter to the house or place of business to run through the sides of the meter box. In order to protect the meter within the meter box, the box normally includes a removable lid. Meter boxes are typically formed from concrete. Plastics are also used to a lesser extent.

A pit-set meter is generally less expensive to install, service and read due to its outdoor location and ready accessibility (usually near curbside). However, one drawback to such pit-set meters is that they have not been readily adaptable to remote meter reading systems.

Most pit-set meters are read manually. A meter reader removes the pit lid, reads the register dial of the meter register, and then records the meter reading, either on a preprinted form or in a small handheld data entry device.

In order to speed up the collection of data, it is known to use what is called remote meter reading. In remote meter reading, an encoded meter register is associated with the water meter. Such a meter register may be, for example, the ARB® or PROREAD™ encoded meter register manufactured by Schlumberger Industries, Inc. These encoded meter registers include an electrical circuit which enables a portable, handheld meter reading unit, such as a Schlumberger UNI-GUN® or ADVANCE™ meter reading unit to remotely interrogate the encoder meter register. This is done by placing an electrical port on the meter reader into contact with a special receptacle that is wired directly to the electronics within the encoder register.

The capability of remotely reading an encoder meter register has been very attractive to the water utility industry. Remote meter reading capability means that the meter reader does not have to gain entry to a home or place of business to get a meter reading since the remote receptacle can be placed at any convenient location within a reasonable distance from the meter. Furthermore, since the handheld meter reading unit automatically interrogates and reads the encoder register, the meter reading acquired by the meter reading unit is accurately recorded by the electronic circuitry of the meter reading unit. This eliminates costly misreading of the water meter.

However, pit-set water meters have been more difficult to adapt to remote meter reading. This is because of the necessity to have a water-proof, tamper-proof, inexpensive and easy to install receptacle for mounting on the pit lid. This receptacle must also be very rugged and be able to withstand full exposure to sun, rain, heat and freezing temperatures. The pit lid receptacle should also have a low profile to minimize possible damage by foot traffic, lawn mowers or the like. It should also be designed to be easily installed in a pit lid and be adaptable to a wide range of pit lid thicknesses.

Prior pit lid receptacles have generally been too large or tall to be commercially acceptable. They also have required several precisely located holes to be drilled in the pit lid. If a mistake is made in drilling these holes, then the receptacle will not fit properly on the pit lid, resulting in either a poor installation or the pit lid having to be replaced at an additional cost to the water utility.

SUMMARY OF THE INVENTION

These and other shortcomings of prior art pit lid remote meter reading receptacles are overcome by the present invention which provides for a pit lid receptacle having three major components. The first component is a substantially annular, cup-like housing having an open end and a closed end. The open end of the housing includes means, such as a mounting post, for mounting an electrical coil and an optical circuit board within the housing. In a preferred embodiment, the electrical coil and circuit board are secured within the housing using a retaining ring which is slipped over the post after the electrical coil and circuit board (which has an opening in its middle) are slipped over the post. An electrical potting compound is then used to fill up the open end of the housing containing the coil and circuit board after an electrical cable is connected to the circuit board.

The receptacle assembly further includes an annular shroud having a closed end and an open end for receiving the housing. The shroud has an annular flange formed around its open end with the flange having a diameter greater than the diameter of the shroud. The shroud includes a pair of openings formed in its closed end with a first opening for receiving a threaded fastener such as a bolt, and the other opening for receiving the electrical cable.

The housing is mounted within the open end of the shroud and is secured within the shroud by means of a pair of arms which snap-fit into openings formed within the closed end of the shroud. The receptacle assembly further includes an annular cup-shaped washer having an open end and a closed end. The closed end includes a pair of openings, one for receiving the threaded fastener and the other for receiving the electrical cable. The washer is reversible in order to accommodate different thicknesses of pit lids.

In operation, an opening of slightly larger diameter than the body of the shroud is formed in the pit lid. The shroud and housing assembly are then placed within the opening with the upper surface of the housing and flange on the upper surface of the pit lid. The washer is then fitted over the threaded fastener which projects through the opening of the pit lid into the underside of the pit lid to secure the receptacle assembly together. The electrical cable is then run to the terminals on the encoder register disposed to the bottom of the meter box.

The housing, shroud and washer are preferably formed from an ultraviolet-stabilized plastic material, such as ultraviolet-stabilized polycarbonate.

The foregoing arrangement is easy to manufacture, easy to assemble and only requires a single opening to be formed in the pit lid. The alignment problems associated with prior art pit lid receptacles which require multiple openings are not present in the present invention. Furthermore, the invention results in a low profile and relatively small diameter pit lid receptacle assembly. This minimizes the possibility of damage due to foot traffic and makes for a less noticeable installation to discourage tampering or vandalism. The present invention also enables the electrical coil circuit board and electrical cable assemblies to be securely fastened within the housing and easily made impervious to the environment through the use of a potting compound.

The reversible washer accommodates a wide range of pit lid thicknesses. The use of ultra-violet stabilized polycarbonate minimizes deterioration of the exposed areas of the receptacle due to the effects of sunlight.

BRIEF DESCRIPTION OF THE DRAWING FIGURES

These and other features and advantages of the present invention will become more apparent from the following detailed description of the preferred embodiment when taken in conjunction with the accompanied drawing figures wherein.

DETAILED DESCRIPTION OF THE PREFERRED EMBODIMENT

Figure 1:
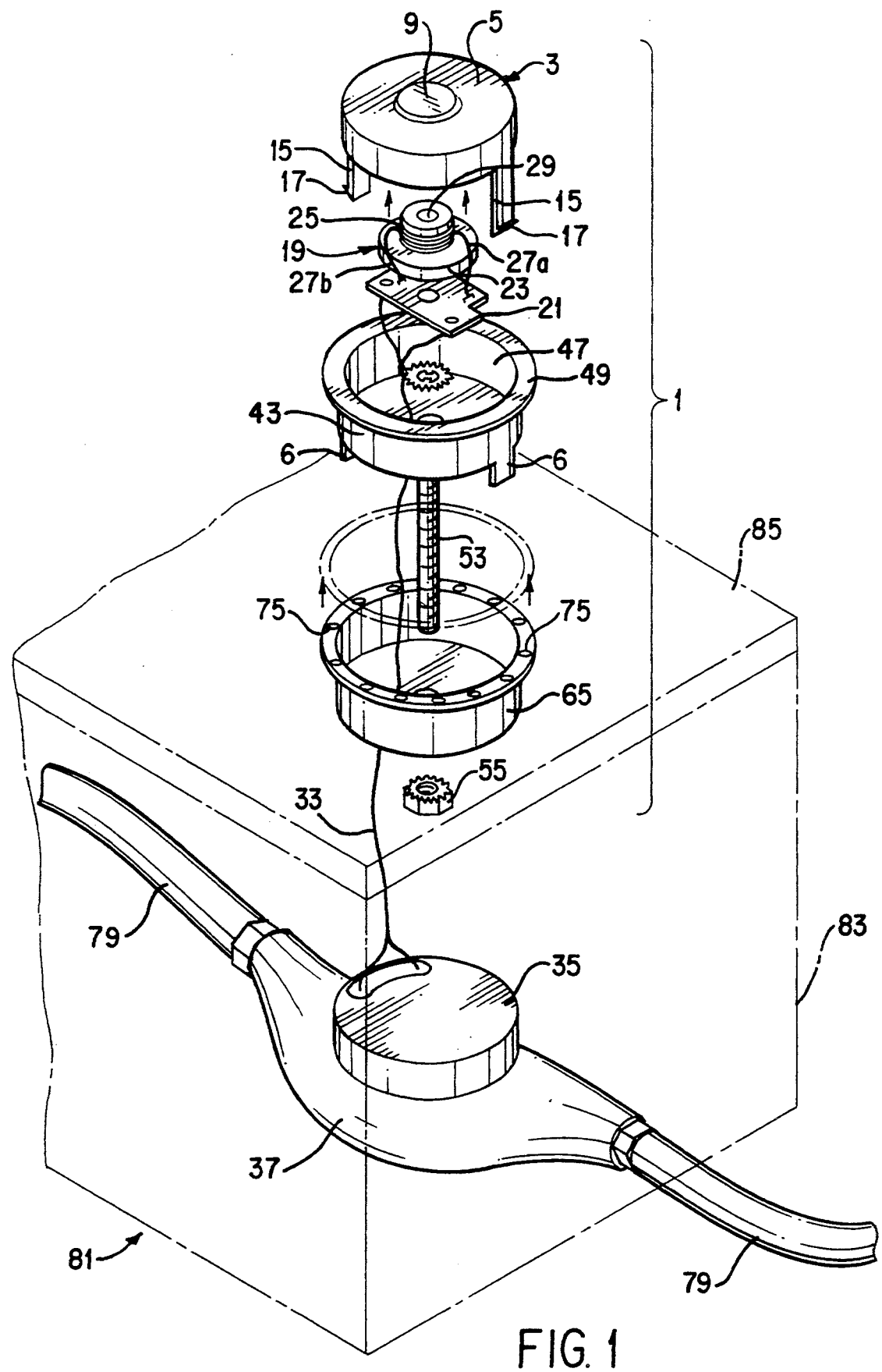
FIG. 1 is an exploded perspective view of the receptacle assembly of the present invention showing its relationship with a meter box, pit lid and water meter having a remotely readable encoder register.

FIG. 1 shows an exploded perspective view of the receptacle assembly 1 of the present invention.

Receptacle assembly 1 includes a housing 3 having an annular, cup-like shape. Housing 3 includes a closed end 5 and an open end 7 (see also FIGS. 2a, 2b and 2c). Housing 3 further includes a raised annular area 9 disposed on the exterior portion of closed end 5. A mounting post 11 (see FIG. 2a) is formed along the longitudinal axis of housing 3 projecting from closed end 5 toward open end 7. Mounting post 11 includes a tapered portion 13 formed on its end.

Housing 3 further includes a pair of arms 15 formed about the periphery of open end 7 and extending in a direction parallel to the longitudinal axis of housing 3 away from closed end 5. Each of the arms 15 include latching ear portions 17 whose function will be described below.

The function of housing 3 is to hold an electrical coil assembly 19 and circuit board 21 securely within the interior of housing 3.

Electrical coil assembly 19 comprises an annular or doughnut-shaped piece of ferrite material 23 about which is wound a plurality of windings of an electrical conductor (e.g. wire) to form an electrically inductive coil 25. Coil 25 is disposed about ferrite material 23 and has a pair of leads 27a and 27b connected to a two-wire electrical cable 33 or, optionally, to electrical circuitry formed on circuit board 21. Electrical coil assembly 19 includes a central opening 29 and circuit board 21 includes a central opening 31 which are dimensioned to receive mounting post 11 when the coil assembly 19 and circuit board 21 are assembled within housing 3.

A two wire electrical cable 33 is connected to leads 27a and 27b of coil 25 or to the electrical circuitry disposed on circuit board 21. The other end of electrical cable 33 is connected to the electrical output of an encoder meter register 35 which is attached to a water meter 37 as described more fully below.

In the preferred embodiment, electrical coil assembly 19 and circuit board 21 are disposed over mounting post 11 of housing 3 after the two wire electrical cable 33 has been connected to the circuitry disposed on circuit board 21.

Electrical coil assembly 19 and circuit board 21 are secured to mounting post 11 by means of a retaining ring 39. Retaining ring 39 is annular in shape and has a plurality of radially inwardly directed teeth which securely engage the surface of mounting post 11.

Figure 2A:
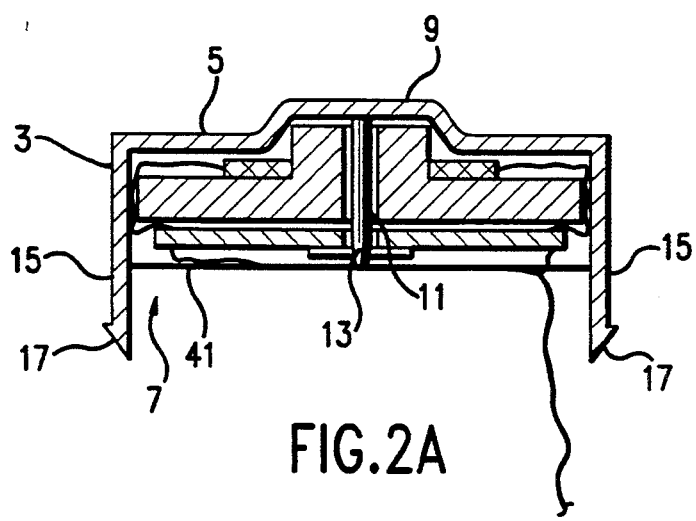
FIGS. 2a, 2b and 2c show, respectively, side, top and bottom views of a housing which forms part of the receptacle assembly shown in FIG. 1.
Figure 2B:
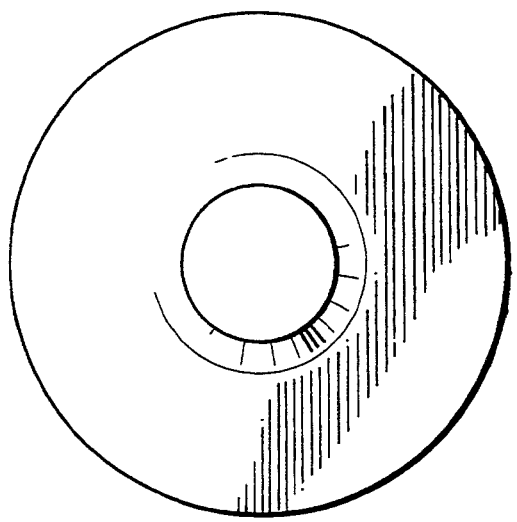
Figure 2C:
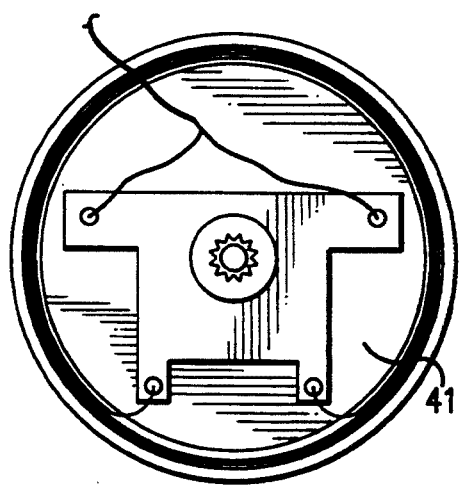
Figure 5:
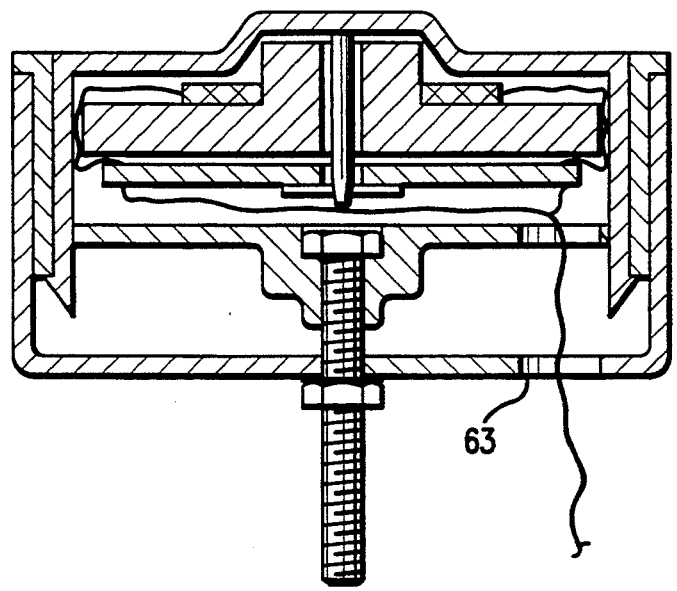
FIG. 5 is a cross-sectional side view of the receptacle assembly of FIG. 1 showing all the component parts fully assembled together.

After assembly of the electrical coil assembly and circuit board within housing 3, a potting material 41, such as "Emerson & Cummings Two Part Epoxy 2651 with Catalyst 9", is poured into the cavity formed by the interior portion of housing 3 to completely immerse and seal coil assembly 19 and circuit board 21 within housing 3 (see also FIGS. 2a, 2c and 5). Potting material 41, when hardened, protects electrical coil assembly 19 and circuit board 21 from moisture and other deleterious environmental effects.

Figure 3A:
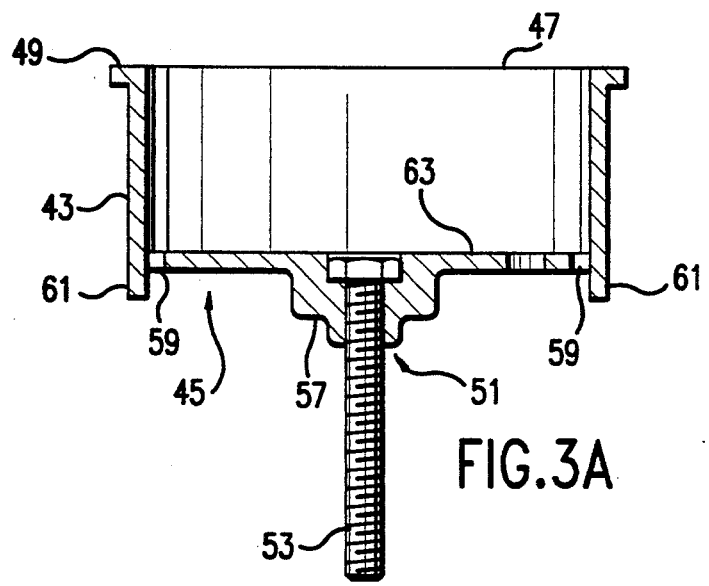
FIGS. 3a, 3b and 3c show, respectively, side, top and bottom views of a shroud which forms part of the receptacle assembly shown in FIG. 1.
Figure 3B:
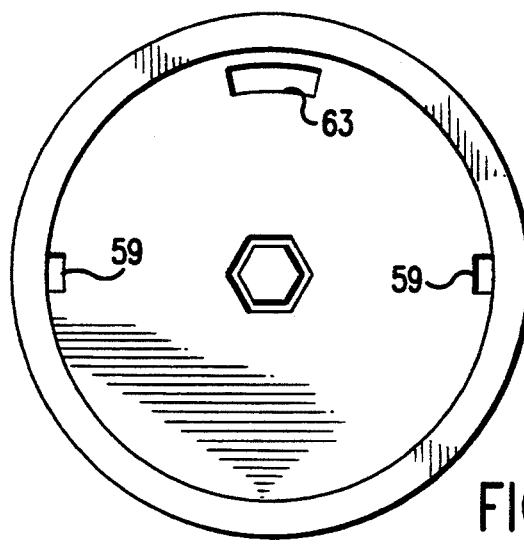
Figure 3C:
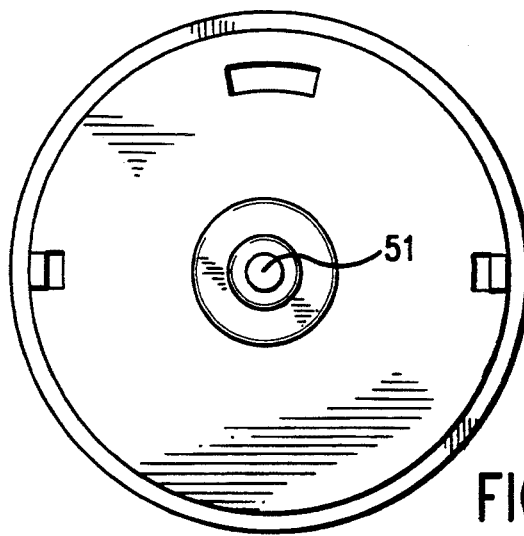

As shown in FIG. 1, receptacle assembly 1 further includes a shroud 43 (see also FIGS. 3a, 3b and 3c). Shroud 43 has an annular cup-like shape with a closed end 45 and an open end 47. An annular flange 49 is disposed about the periphery of open end 47 and has a diameter greater than that of open end 47. Shroud 43 further includes a central opening 51 for receiving a threaded fastener 53. In a preferred embodiment, threaded fastener 53 comprises a threaded bolt and a lock washer and nut fastener 55.

Central opening 51 of shroud 43 includes an annular reinforced area 57 surrounding central opening 51. The closed end 45 of shroud 43 includes a first pair of openings 59 which are designed to receive arms 15 of housing 3 and the latching ear portions 17 of arms 15 when housing 3 is assembled to shroud 43. Shroud 43 further includes a pair of raised projections 61 which cooperate with latching ear portions 17 of arms 15 to secure housing 3 within shroud 43 when housing 3 is snap-fit within shroud 43, as shown in FIG. 5. Arms 15 are flexible enough so that they may be flexed radially inward toward the longitudinal axis of housing 3 in order to release latching ear portions 17 from engagement with raised projection 61 of shroud 43 if it becomes necessary to remove housing 3 from shroud 43.

The closed end 45 of shroud 43 further includes an opening 63 for receiving electrical cable 33 (see FIG. 5).

The interior portion of shroud 43 has a diameter slightly greater than the outer diameter of housing 3 in order to ensure a snug fit between housing 3 and shroud 43 when housing 3 is mounted within shroud 43.

Figure 4A:
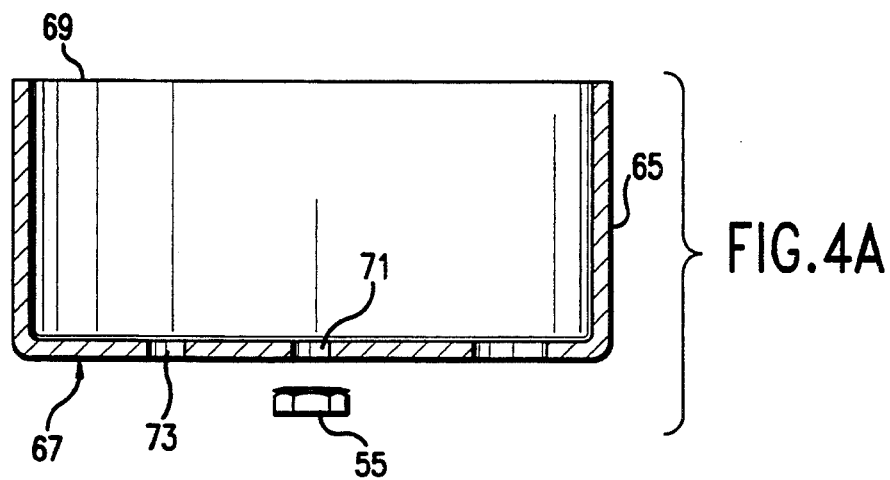
FIGS. 4a, 4b and 4c show, respectively, side, top and bottom views of a washer which forms part of the receptacle assembly shown in FIG. 1.
Figure 4B:
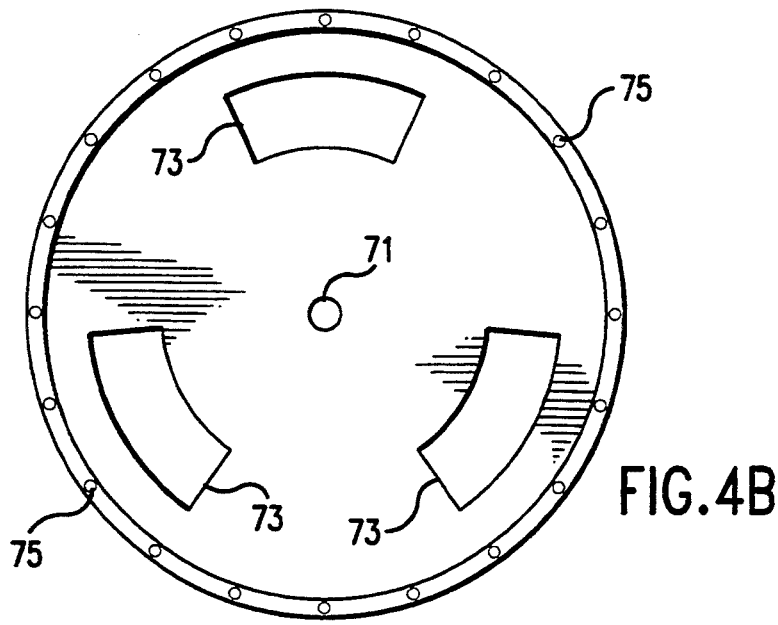
Figure 4C:
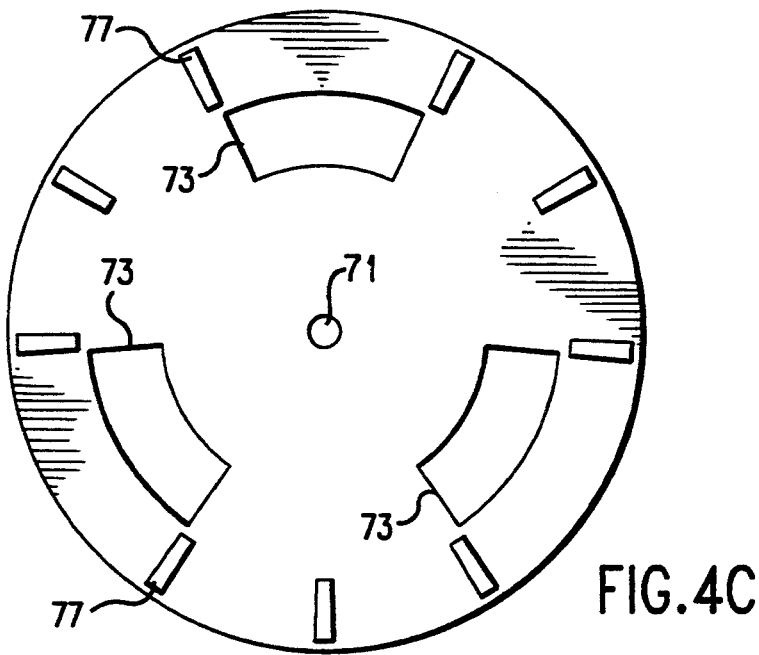

Receptacle assembly 1 further includes a washer 65 having an annular, cup-like shape. Washer 65 has a closed end 67 and an open end 69 (see also FIGS. 4a, 4b and 4c). Washer 65 includes a central opening 71 for receiving threaded fastener 53 and at least one opening 73 for receiving electrical cable 33.

The periphery of open end 69 of washer 65 preferably includes a plurality of raised bumps 75 whose function will be explained below. The outer surface of closed end 67 of washer 65, also preferably includes a plurality of raised areas 77.

The area of diameter of washer 65 is dimensioned to be larger than the outer diameter of shroud 43. Raised bumps 75 and raised area 77 are designed to increase the gripping power of either open end 69 or the outer surface of closed end 67, respectively, when washer 65 is assembled to the housing and shroud assembly in either its normal or reversed positions as described below.

Figure 6:
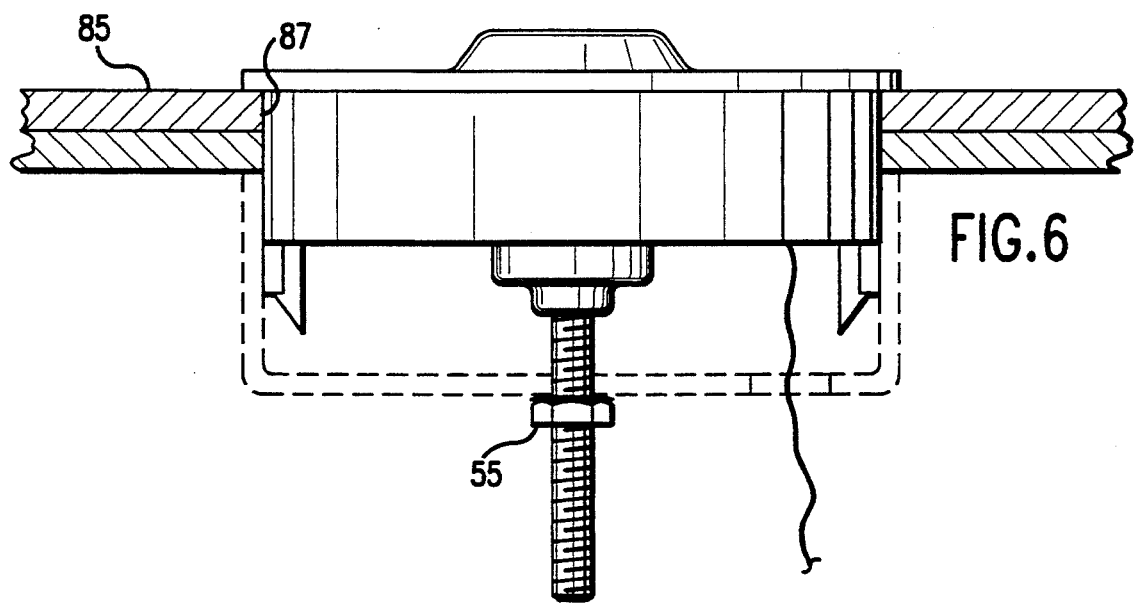
FIG. 6 shows the receptacle assembly of FIG. 1 mounted within an opening formed in a relatively thin pit lid.
Figure 7:
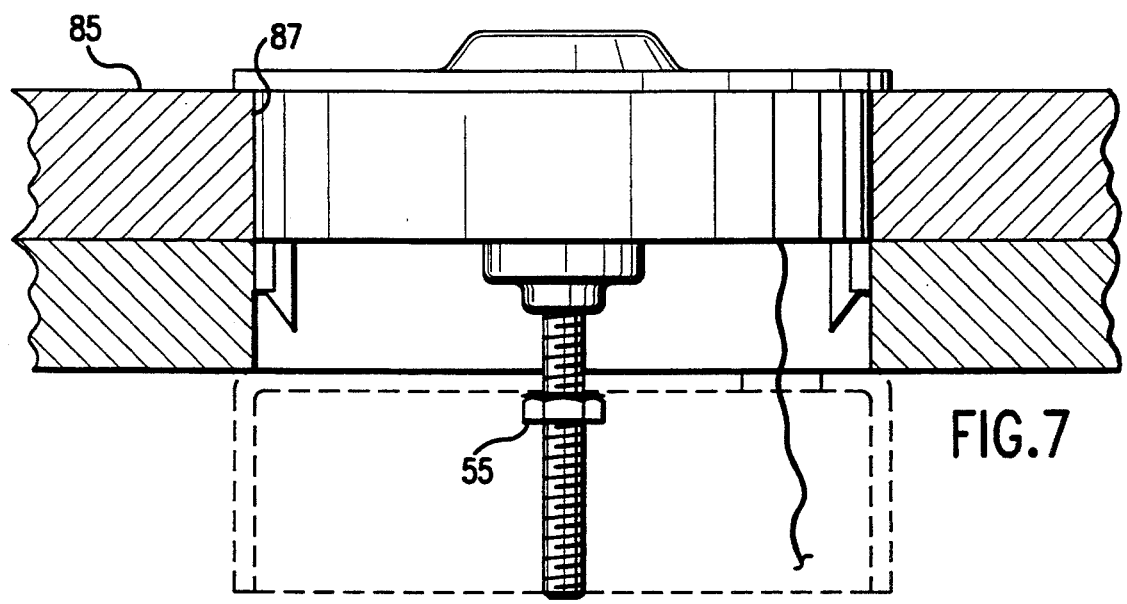
FIG. 7 shows receptacle assembly of FIG. 1 mounted to a relatively thick pit lid wherein the washer is reversed in position with respect to the assembly shown in FIG. 6.

With reference to FIGS. 1, 6 and 7, receptacle assembly 1 is shown in its unassembled (FIG. 1) and assembled conditions (FIGS. 6 and 7). Receptacle assembly 1 is designed to be used in conjunction with a water meter having an encoder meter register, such as the Neptune Model T-10 water meter and PROREAD TM encoder meter register manufactured by Schlumberger Industries, Inc. The details of operation of the PROREAD TM encoder meter registration do not play a part in the present invention and are clearly described in U.S. Pat. No. 5,155,481. Briefly, encoder register 35 contains a manual index which is driven by the positive displacement water metering mechanism contained within water meter 37. This mechanical index drives an odometer-type register which displays water consumption in appropriate units. One or more of the odometer display wheels includes a position sensitive encoding mechanism, such as shown in U.S. Pat. No. 4,085,287, that detects the position of its associated odometer display wheel. Also contained within encoder meter register 35 is electronic circuitry, such as shown in the aforementioned U.S. Pat. No. 5,155,481, which converts the mechanical position information for each of the encoded odometer wheels into a corresponding electrical signal. As described in the aforementioned U.S. Pat. No. 5,155,481, a portable, handheld meter reader/interrogator unit (not shown) includes a inductive port. This port is dimensioned to mate with the exposed area 9 of housing 3. The inductive port of the meter interrogator unit is then electrically inductively coupled to electrical coil assembly 19 disposed within housing 3 of the receptacle assembly 1. The electrical signal applied by the meter interrogator unit is transmitted via electrical cable 33 to connections provided on encoder meter register 35 and thence to the electrical circuitry contained therein.

In this manner, the handheld meter interrogator unit can be used to obtain meter reading (consumption) information from encoder meter register 35 without the meter reader having to visually read the odometer dial.

The receptacle assembly 1 of the present invention is particularly adapted for use with water meters disposed in pits. Pit settings are used primarily in areas where the frostline does not penetrate more than a few inches into the ground. A pit 81 is dug in the ground between a water main and a residence or place of business. A water meter 37 is placed in a service line 79 running between the water main (not shown) and the residence or place of business (also not shown) where water is to be supplied.

In order to prevent subsidence of the surrounding ground, pit 81 is generally shored up with a concrete or plastic meter box 83, shown in dashed line in FIG. 1. Meter box 83 is usually square or rectangular in shape and has open upper and lower ends, with openings in its lower end to accommodate service line 79. Meter box 83 further includes a cast iron or plastic pit lid 85. Pit lid 85 may come in a wide range of thicknesses, making assembly of prior art pit lid remote meter reading receptacles difficult without having on hand a number of different length mounting bolts.

However, the present invention overcomes this difficulty by providing the reversible washer 65 which, as shown in FIGS. 6 and 7, can accommodate various thicknesses of pit lids. FIG. 6 shows a conventional arrangement for use with a relatively thin pit lid 85. FIG. 7 shows washer 65 reversed to accommodate a thicker pit lid 85.

In a preferred embodiment, housing 3, shroud 43 and washer 65 are all made from an ultraviolet stabilized plastic material such as ultraviolet stabilized polycarbonate.

In order to install a receptacle assembly 1 on pit lid 85, first the housing 3 is pre-assembled to shroud 43 with threaded fastener 53 extending through opening 51 formed in the closed end of shroud 43. Electrical cable 33 is routed through opening 63 formed in the closed end 45 of shroud 43.

An opening 87 is then formed (e.g. drilled or cast) in pit lid 85 having a diameter slightly larger than the diameter of closed end 45 of shroud 43.

The housing and shroud assembly are then placed into opening 87 formed in pit lid 85 with threaded fastener 53 projecting downward toward the interior of pit 81. Depending upon the thickness of pit lid 85, washer 65 is then disposed about threaded fastener 53 from the underside of pit lid 85, as shown in FIGS. 6 and 7. Electrical cable 33 is disposed through one of the openings 73 formed in the closed end 67 of washer 65. Lock washer and nut assembly 55 are then threaded onto threaded fastener 53 to secure washer 65 against the underside of pit lid 85. This also causes the flange portion 49 of shroud 43 to be snugly pressed against the upper surface of pit lid 85.

When oriented as shown in FIG. 6, raised bumps 75 formed on the periphery of open end 69 of washer 65 securely grip the underside of pit lid 85. When oriented as shown in FIG. 7, raised areas 77 formed on the outer side of closed end 67 of washer 65 securely grip the underside of pit lid 85.

The free end of electrical cable 33 is then connected to the appropriate connectors provided on encoder meter register 35 and the pit lid 85 is then placed over meter box 83 to close off pit 81.

With the foregoing arrangement for the receptacle assembly 1, assembly of the receptacle assembly to the pit lid requires drilling of only one hole in the pitlid. Furthermore, the described arrangement enables pit lids of various thicknesses to be readily accommodated. In a preferred embodiment, the outer diameter of shroud 43 is a 1¾" and, when the receptacle assembly 1 is assembled to pit lid 85, the exposed portion of housing 3 and shroud 43 on the upper surface of pit lid 85 only projects approximately 0.32" above the surface of pit lid 85. This low profile, combined with the smooth contours of raised annular area 9 of housing 3, minimizes the chance of debris accumulating over or around annular area 9 which might otherwise interfere with the inductive coupling necessary between the remote hand-held meter reading unit and the electrical coil assembly 19 disposed within housing 3. Furthermore, the low profile of the exposed portion of receptacle assembly 1 minimizes the likelihood of damage to receptacle assembly one by foot traffic, lawn mowers or the like. Such a low profile receptacle assembly is also less likely to be noticed by a passerby and hence is less likely to be a target of tampering or vandalism.

While the foregoing invention has been described in considerable detail, the foregoing detailed description should be considered to be merely illustrative of the invention and not limitive of the invention which is set forth in appended claims.

We claim:

1. A receptacle assembly for remote reading of a utility meter comprising:
   (a) a substantially annular housing having an open end and a closed end, said substantially annular housing including first means for mounting an electrical coil therein, and said substantially annular housing further including second means for mounting said substantially annular housing to an external substantially annular shroud;
   (b) an electrical coil mounted in said first means for mounting, said electrical coil including an electrical cable connected thereto;
   (c) said external substantially annular shroud having a closed end and an open end for receiving said annular housing, said external substantially annular shroud being substantially cylindrical in shape and having an annular flange portion formed around said open end thereof and a remaining cylindrical portion, said flange extending outward from said external substantially annular shroud, whereby the maximum diameter of said flange is greater than said remaining cylindrical portion of said shroud, said shroud further including:
      (1) means for cooperatively fastening said second mounting means of said substantially annular housing to said external substantially annular shroud;
      (2) a first opening formed in said closed end of said external substantially annular shroud for receiving a threaded fastener; and
      (3) a second opening formed in said closed end of said external substantially annular shroud for receiving said electrical cable; and
   (d) a substantially annular cup-shaped washer having an open end and a closed end, said washer having a first opening for receiving said threaded fastener and a second opening for receiving said electrical cable.

2. The receptacle assembly of claim 1 further including:
   (a) a substantially flat pit lid having an opening formed therein for receiving said housing and shroud;
   wherein in use, said annular flange portion of said shroud is disposed in said pit lid opening against a first surface of said pit lid with said threaded fastener projecting through said pit lid opening, and said washer is disposed with said projecting through said pit lid opening, and said washer is disposed with said threaded fastener passing through said first opening of said washer so as to secure said washer to a second surface of said pit lid opposite said first surface.

3. The receptacle assembly of claim 2 wherein the diameter of said annular flange portion of said housing and the diameter of said washer are greater than the diameter of said opening formed in said pit lid and wherein said washer is reversible whereby either its open end or closed end may be disposed in contact with said second surface of said pit lid.

4. The receptacle assembly of claim 1 wherein:
   said electrical coil is annular shaped and has a central opening formed therein for receiving said first mounting means; and
   said first mounting means comprises:
      a shaft formed at the center of said closed end of said housing and projecting toward said open end of said housing; and
      a fastener for securing said coil about said shaft within said housing.

5. The receptacle assembly of claim 4 wherein said shaft has a tapered end and said fastener is an annular retaining ring disposed about said tapered end of said shaft having a plurality of teeth directed radially inward for frictionally engaging said tapered end of said shaft.

6. The receptacle assembly of claim 1 wherein said second mounting means comprises at least two arms formed about said open end of said housing and projecting parallel to a longitudinal axis of said housing away from said closed end of said housing, said arms including tapered ears formed on the ends thereof; and said shroud including at least a pair of openings formed about said closed end of said shroud for receiving said ears in a snap-fit manner.

7. The receptacle assembly of claim 1 wherein said threaded fastener is a bolt threaded along its length and having a head at one end, said head disposed in a recess formed in said closed end of said shroud.

8. The receptacle assembly of claim 1 wherein said electrical coil is potted within said housing.

9. The receptacle assembly of claim 1 wherein said housing, shroud and washer are formed from an ultra-violet stabilized plastic material.

10. The receptacle assembly of claim 9 wherein said material is an ultra-violet stabilized polycarbonate.

* * * * *